United States Patent [19]

Bullough

[11] 4,282,039

[45] Aug. 4, 1981

[54] CARBON RAMMING MIX

[75] Inventor: Vaughn L. Bullough, Florence, Ala.

[73] Assignee: Reynolds Metals Company, Richmond, Va.

[21] Appl. No.: 164,222

[22] Filed: Jun. 30, 1980

[51] Int. Cl.$^3$ ............................................. C08L 95/00
[52] U.S. Cl. ................................. 106/278; 106/38.25; 106/280; 106/281 R; 106/284
[58] Field of Search ................... 106/280, 281 R, 284, 106/278, 38.25; 264/29.5; 252/510; 204/294

[56] References Cited

U.S. PATENT DOCUMENTS

| | | | |
|---|---|---|---|
| 2,903,374 | 9/1959 | Ramse et al. | 252/510 |
| 2,998,375 | 8/1961 | Peterson et al. | 204/294 |
| 3,576,700 | 4/1971 | Dell | 204/294 |
| 3,871,986 | 3/1975 | Reamey et al. | 204/243 R |
| 3,925,092 | 12/1975 | Reamey et al. | 106/281 R |
| 4,167,419 | 9/1979 | Dell | 106/284 |
| 4,188,279 | 2/1980 | Yan | 106/278 |
| 4,192,730 | 3/1980 | Dumas et al. | 204/294 |

FOREIGN PATENT DOCUMENTS 7812447 4/1978 France .
7904769 2/1979 France .

Primary Examiner—Lorenzo B. Hayes
Attorney, Agent, or Firm—Glenn, Lyne, Girard & McDonald

[57] ABSTRACT

A cold ramming mix suitable for ramming of alumina reduction cell cathode seams at ambient temperature comprising:

(A) a solid portion comprising:
  (I) from about 30 to about 60 weight percent of coarse calcined anthracite;
  (II) from about 50 to about 30 weight percent of anthracite dust; and
  (III) from about 1 to about 10 weight percent graphite dust;
(B) from about 5 to about 15 weight percent based on the weight of the solid portion of a binder pitch; and
(C) from about 5 to about 10 weight percent based on the weight of the solid portion, of a heavy petroleum distillate oil having a 95% distillation range of between about 370° and 540° C.

A method for producing such a mix comprising blending A and B to provide a homogeneous mixture and subsequently blending in C under conditions which assure that the pitch binder is not dissolved in the oil of C is also described.

11 Claims, No Drawings

CARBON RAMMING MIX

BACKGROUND OF THE INVENTION

1. Field of the Invention

The present invention relates to a cold fumeless carbon mixture suitable for ramming of alumina reduction cell cathode seams and sidewalls, the linings of carbon-lined crucibles and the patching of same, and a method for producing such mixtures.

2. Discussion of the Prior Art

In the conventional practice of producing aluminum metal by the electrolytic reduction of alumina in a cell, the cathode of the cell is a large tank lined with carbon. Carbon blocks with steel electrodes embedded in them form the bottom of this cell and are spaced uniformly so that approximately 2-inches is provided between each block for ramming a seam. These blocks provide higher strength, higher density and lower porosity and resistance than a continuous (monolithic) rammed paste lining. The blocks are formed into a liquid tight container surface by filling the joints between the blocks with a rammed carbonaceous cement. In conventional practice this cement is made up of a graded aggregate of calcined anthracite with a mixture of coal tar pitch having a softening point of about 75° C. This mix is heated to a consistency such that the mix can be rammed into the joints between the cathode blocks. At the temperature of mixing (about 150° C.) and the temperature of installation (about 130° C.), this mixture fumes and steams badly providing an extremely undesirable working atmosphere with a fume that is a skin, lung and eye irritant. The material must be worked over a very limited temperature range, because when too cold the mixture does not compact satisfactorily and breaks up and crumbles when it is tamped in the joint between the cathode blocks. Considerable coordination is needed to insure delivery of the mix at a proper temperature and to provide adequate labor to ram the mix before it cools and becomes unworkable.

Present manufacturing practices require unnecessary expenditure of energy in holding the binder pitch in liquid storage and in providing heat to the mixture to warm the aggregate material and blend the materials to a proper consistency. This mixing time is usually 30 minutes to an hour, depending on the capacity of the heating system to the mixer. The mix must usually be used within an hour of manufacture or it becomes chilled and unworkable.

Attempts have been made over the year to improve the seam ramming mix, for example Dell (U.S. Pat. No. 3,576,700) and Reamey (U.S. Pat. No. 3,871,986 and U.S. Pat. No. 3,952,092) patented systems for improving the lining practice and developing advantageous substitutes for coal tar pitch. More recently, Dell, (U.S. Pat. No. 4,167,419) patented a mix for reducing the ramming temperature by including a solvent that lowered the softening point of the pitch to produce a mix capable of being tamped without the application of heat. French patent applications (FR No. 7,812,447 and FR No. 7,904,769) were published by D. Dumas (Savoy) for a cold carbon paste for sealing reduction cell linings where the low temperature plasticizer is a carbohydrate such as molasses and the permanent binder is a high softening point pitch. Other proposed binder systems have included such materials as furfural resins.

SUMMARY OF THE INVENTION

We have developed a system for the preparation of a cold ramming mix that greatly reduces the energy, labor and scheduling requirements for reduction cell lining while eliminating the noxious fumes associated with this operation. This mix has been extensively tested in the laboratory, and has been used on an experimental basis to install the cathodes in full size alumina reduction cells. It has been used to patch sidewalls in reduction cells, thus increasing their service life, and has been used to line crucibles used for handling molten metal.

The ramming mix of the present invention comprises a cold ramming mix suitable for ramming of alumina reduction cell cathode seams at ambient temperature comprising:

(A) a solid portion comprising:
  (I) from about 30 to about 60 weight percent of coarse calcined anthracite;
  (II) from about 50 to about 30 weight percent of anthracite dust; and
  (III) from about 1 to about 10 weight percent graphite dust;
(B) from about 5 to about 15 weight percent based on the weight of the solid portion of a binder pitch; and
(C) from about 5 to about 10 weight percent based on the weight of the solid portion of a heavy petroleum distillate oil having a 95% distillation range of between about 370° and 540° C.

A method for producing such a mix comprising blending A and B to provide a homogeneous mixture and subsequently blending in C under conditions which assure that the pitch binder is not dissolved in the oil of (C) is also described.

The method for preparing the ramming mix of the present invention which method is distinguished from prior art methods which use lower boiling distillates to lower the working temperature of the mix in that in the instant mix the distillate does not dissolve the pitch binder during formulation but merely acts as a temporary second binder comprises the steps of:

(A) blending the coarse anthracite, anthracite dust, graphite flour (dust) and petroleum pitch for a period of time sufficient to provide a homogeneous mixture;
(B) adding the petroleum distillate; and
(C) blending the homogeneous product mixture of step (A) with the petroleum distillate of (B) under conditions such that the petroleum pitch is not dissolved in the petroleum distillate.

DETAILED DESCRIPTION OF THE INVENTION

The properties and identity of useful "solid" materials, i.e. the coarse anthracite, fine anthracite and graphite flour or dust, of the ramming mixtures of the present invention are readily recognized by those skilled in the ramming mix art. Table I provides a diagrammatic representation of the screen analysis of such solids useful in the mixtures described herein.

TABLE I

| Screen Size | Graphite Flour | Retained, w/o Anthracite Fine Fraction | Coarse Fraction |
|---|---|---|---|
| 0.525 | | | 2.35 |
| 0.271 | | | 18.38 |

TABLE I-continued

| Screen Size | Graphite Flour | Retained, w/o Anthracite Fine Fraction | Retained, w/o Anthracite Coarse Fraction |
|---|---|---|---|
| 4 | | | 48.10 |
| 8 | | | 11.78 |
| 14 | | 0.05 | 6.42 |
| 20 | | 0.10 | 2.57 |
| 28 | | 0.13 | 1.66 |
| 48 | | 6.93 | 4.01 |
| 100 | 22.15 | 31.16 | 2.46 |
| 200 | 25.51 | 26.36 | 1.18 |
| 325 | 38.48 | 16.55 | 0.43 |
| Pan | 13.86 | 18.72 | 0.65 |

Number 2 Buckwheat size calcined anthracite has been found particularly useful as the coarse fraction of the mixture, however, other similar anthracites are also useful as are the various fine anthracites and graphite flours which have been found useful in similar prior art ramming mixes.

The binder pitch of the mixtures of the present invention may be a petroleum pitch or a coal tar pitch having a softening point of between about 110° and 130° C. (cube-in-air melting point), preferably between about 115° and 125° C. Such pitch materials are generally available as so-called flake petroleum pitches or coal tar pitches. Table II shows other typical properties of such materials.

The heavy petroleum distillate oil which, in the present mixtures, forms or acts as a temporary secondary binder for the "solid components" of the mixture and not as a solvent for the binder pitch can be any suitable heavy distillate fraction from a catalytic cracker or, if derived from straight run petroleum a distillate which demonstrates a 95–100% distillation range according to ASTM D 1160 of between about 700° F. and 1,000° F. (370°–540° C.). A specifically preferred such distillate is one having a distillation range of 5% at 415° C. and 95% at 519° C. a specific gravity API of 9.3, a viscosity of 123 centistokes at 140° F. and 18.6 centistokes at 210° F., an aniline point of 86, a flashpoint of 480° F. COC and a pour point of 55° F. Numerous other heavy petroleum distillate oils can, of course, be used and substitution of these will be readily apparent to the skilled artisan.

TABLE II

| Typical Properties Of Coal Tar Pitch | |
|---|---|
| Softening Point, C/A | 115° C. |
| Xylene Insoluble | 32% |
| Quinoline Insoluble | 18% |
| Modified Conradson Carbon | 62% |
| Specific Gravity | 1.34 |

| Typical Properties Of Petroleum Pitch | |
|---|---|
| Softening Point, C/A | 124° C. |
| Benzene Insoluble | 16% |
| Quinoline Insoluble | 1% |
| Modified Conradson Carbon | 54% |
| Specific Gravity | 1.27 |

In the preparation of the ramming mixture, as will be apparent from the examples below, it is critical that in formulating the mixture of the solids and pitch binder with the temporary secondary oil binder the pitch not be dissolved in the oil as suggested by Dell for the formulation of ramming mixes using as the "solvent" oil a methylnaphthlene. Thus, preparation is accomplished by blending the coarse and fine anthracite, the graphite and the pitch in a suitable blending apparatus to obtain a homogeneous mixture (generally blending for about 5 minutes will achieve this result) and then blending the heavy oil under conditions of temperature and time such that a uniform blend of the solids, pitch and oil is obtained without the pitch becoming dissolved in the oil. Generally accomplishing this latter blending step at a temperature below about 80° C. will permit accomplishing the blending without dissolution of the pitch.

As will also be shown in the Examples below, ramming mixtures prepared in this fashion with the materials just described exhibit prolonged "shelf-life" or storage capability, can be rammed at ambient temperatures and when so utilized generate none of the harmful fumes so common to prior art mixtures.

EXAMPLES

The following examples will serve to better illustrate the successful practice of the instant invention.

EXAMPLE 1

The heat was disconnected from a carbon paste batch mixer with a sigma type blade design and the following formulation was charged to the mixer: 1,307 lb of the number 2 Buckwheat fraction of calcined anthracite, 1,307 lb of the calcined anthracite fines fraction and 100 lb of graphite flour were charged to the mixer, along with 239 lb of solid flake petroleum pitch, with a softening point of 120° C./A. This constitutes a ratio of 48.2% anthracite, 48.2% anthracite dust and 3.6% graphite flour with 7.5% binder pitch. The mixer blades were started and the solid components, including the petroleum pitch, were mixed for 5 minutes to provide uniform distribution. Then 239 lb of a heavy petroleum distillate oil, with a distillation range of 415° C. to 519° C. was introduced and allowed to mix another 5 minutes. This mix, and other batches mixed in a similar manner, were used to ram the bottom seams and sidewalls of an alumina reduction cell. Mixing and ramming took place at a temperature of 10° C. It was observed that no fumes were visible during the mixing or ramming of a reduction cell.

A thin layer of coarse coke was placed on the cell bottom, the anodes were set in place, and the cell was placed on line load to provide for preheating the cell bottom and baking out of the seams and sidewalls. Twelve hours later, cryolite was melted in the cell, molten aluminum transferred to the cell and the cell was placed in production with satisfactory results.

EXAMPLE 2

Excess mix remaining from the ramming of the cell in Example 1 (approximately 2,000 lb) was saved in open storage at ambient temperature for 60 days and was then used in the lining of another cell. There was no detectable deterioration of the mix. Conventional, hot rammed mix, or mixes prepared with sugar binder for the secondary binder would within this time period, deteriorate to a point that they would have to be scrapped.

We have demonstrated by experiment a different manufacturing principle than that taught by Dell where he uses a solvent oil (methylnapthlene) to reduce the softening point of the pitch. In our practice we deliberately avoided dissolving the pitch and used the petroleum oil only for a secondary binder to provide workability to the carbon mix.

This principle will become clear in the following Examples 3-5.

EXAMPLE 3

A series of mixes were prepared in a 6-gallon laboratory mixer. The proportions of number 2 Buckwheat size calcined anthracite, calcined anthracite flour, and graphite flour were held constant in the ratio of 65:35:5 and the amount of flake petroleum pitch with a softening point of 120° C. cube in air and/or solid coal tar pitch with a softening point of 115° C. cube in air were varied from 6 to 10%. A constant amount of high boiling petroleum oil (6½% of the dry aggregate) was used in all experiments.

The dry components were premixed for 5 minutes as in Example 1. The oil was then added and mixing continued for an additional 5 minutes. The mixes were allowed to stand overnight at room temperature (20° C.) and then a seam of mix was simulated by tamping the mix between two steel plates, spaced 2-inches apart, with a pneumatic hammer. The steel plates were removed and the free-standing mix seam was packed in calcined coke, transferred to a laboratory furnace and baked to approximately 1000° C. in a heating cycle from ambient to 1000° C. in approximately 8 hours. Density, shrinkage, or expansion and the amount of packing materials sticking to the seam were used to judge the quality of the seam. A mix using petroleum pitch as taught by Reamey (U.S. Pat. No. 3,871,986) was used as a control to judge the quality of the cold ram seam mixes. Properties of seams formed in this fashion are shown in Table II.

EXAMPLE 4

To demonstrate that the role of the petroleum oil was that of a temporary binder and not a vehicle to lower the softening point of the primary coal tar or petroleum pitch binder, an experiment was performed similar to Example 3 where the only binder in the system was the petroleum oil (no coal tar pitch, nor petroleum pitch were used in the mix). This seam was rammed between the steel plates and formed a free standing green (unbaked) seam, not different from the other seams described in the above experiment. The green density of this seam was the same as other seams. On baking to 1000° C., the seam crumbled.

EXAMPLE 5

An experiment was performed where the formulation was used as in Example 3, 7½ pitch, 7½ petroleum oil, except that the mix was heated to 100° C. allowing the oil to dissolve the solid petroleum pitch and forming a mix with an estimated binder softening point of 50° C. This mix, when cooled and allowed to stand overnight was lumpy and crumbled and did not perform well in the simulated seam experiment.

Typical properties of seams formed as described as shown in Table III.

TABLE III

PROPERTIES OF SAMPLES PREPARED WITH 60% COARSE ANTHRACITE, 35% ANTHRACITE DUST, 5% GRAPHITE FLOUR

| Percent Petroleum Oil | Petroleum Pitch | Coal Tar Pitch | Green Density | Baked Density | Crushing Strength | % Baking Expansion | Coke Adherence |
|---|---|---|---|---|---|---|---|
| 7.5 | 10.0 | 0 | 1.47 | 1.30 | 1510 | 2.07 | Very Heavy |
| 7.5 | 8.0 | 0 | 1.46 | 1.28 | 1507 | 3.19 | Very Heavy |
| 7.5 | 6.0 | 0 | 1.49 | 1.38 | 1373 | 1.02 | Heavy |
| 7.5 | 0 | 10.0 | 1.49 | 1.35 | 1770 | −1.86 | Heavy |
| 7.5 | 0 | 8.0 | 1.52 | 1.40 | 1870 | 0.36 | Heavy |
| 7.5 | 0 | 6.0 | 1.49 | 1.43 | 1837 | 0.33 | Light |
| 6.5 | 0 | 0 | 1.56 | — | — | — | |
| 6.5 | 0 | 6.5 | 1.52 | 1.38 | 1289 | | |

TABLE IV

PROPERTIES OF SAMPLES PREPARED WITH VARIABLE AGGREGATE FORMULATIONS

| % Anthracite Coarse | % Anthracite Fine | Graphite Dust | % Oil | % Petroleum Pitch | Green Density | Baked Density | % Expansion | Crushing Strength |
|---|---|---|---|---|---|---|---|---|
| 60 | 30 | 10 | 6.75 | 6.75 | 1.53 | 1.40 | 1.00 | 639 |
| 60 | 35 | 5 | 6.75 | 6.75 | 1.55 | 1.36 | 1.39 | 987 |
| 60 | 35 | 5 | 6.25 | 6.25 | 1.46 | 1.35 | −0.12 | 318 |
| 60 | 35 | 5 | 6.5 | 6.5 | 1.52 | 1.37 | 0.35 | 716 |
| 60 | 35 | 5 | 6.5 | 6.5 | 1.45 | 1.35 | 0.36 | 955 |
| 49 | 49 | 2 | 6.5 | 6.5 | 1.44 | 1.33 | 0.43 | 1,360 |

We claim:

1. A cold ramming mix suitable for ramming of alumina reduction cell cathode seams at ambient temperature comprising:
   (A) a solid portion comprising
       (I) from about 30 to about 60 weight percent of coarse calcined anthracite;
       (II) from about 50 to about 30 weight percent of anthracite dust; and
       (III) from about 1 to about 10 weight percent graphite dust;
   (B) from about 5 and about 15 weight percent based on the weight of the solid portion of a binder pitch; and
   (C) from about 5 to about 10 weight percent based on the weight of the solid portion of a heavy petroleum distillate oil having a 95% distillation range between about 370° and 540° C.

2. The ramming mix of claim 1 wherein the coarse calcined anthracite comprises number 2 Buckwheat size calcined anthracite.

3. The ramming mix of claim 1 where the binder pitch is selected from the group consisting of solid petroleum pitch having a softening point of about 120° C. cube in air and solid cold tar pitch with a softening point of about 115° C. cube in air.

4. The ramming mix of claim 1 wherein the heavy petroleum distillate oil in a heavy distillate fraction from a catalytic cracker.

5. The ramming mix of claim 1 wherein the heavy petroleum distillate oil is in a distillate fraction from straight run petroleum having a distillation range according to ASTM D 1160 of 5% at 779° F. through 95% at 967° F., a specific gravity API of 9.3, a viscosity of 140° F. of 123 centistokes and at 210° F. of 18.6 centistokes, an aniline point of 86, a flashpoint of 480° F. COC and a pour point of 55° F.

6. A method for preparing a cold ramming mix suitable for ramming of alumina reduction cell cathode seams at ambient temperature comprising the steps of:
   (A) blending for a period of time sufficient to provide a homogeneous mixture comprising;
      (I) from about 30 to about 60 weight percent of coarse calcined anthracite;
      (II) from about 50 to about 30 weight percent of anthracite dust;
      (III) from about 1 to about 10 weight percent graphite dust; and
      (IV) from about 5 to about 15 weight percent based on the combined weight of I, II and III of a binder pitch;
   (B) adding from about 5 to about 10 weight percent based on the combined weight of I, II and III of a petroleum distillate oil having a 95% distillation range between about 370° and 540° C.; and
   (C) blending the product of step (B) under conditions which provide a homogeneous mixture and the binder pitch is not dissolved in the petroleum distillate.

7. The method of claim 6, wherein the blending of step (C) is performed at a temperature below about 80° C.

8. The method of claim 7 wherein the coarse calcined anthracite comprises number 2 Buckwheat size calcined anthracite.

9. The method of claim 7 wherein the binder pitch is selected from the group consisting of solid petroleum pitch having a softening point of about 120° C. cube in air and solid cold tar pitch with a softening point of about 115° C. cube in air.

10. The method of claim 7 wherein the heavy petroleum distillate oil is a heavy distillate fraction from a catalytic cracker.

11. The method of claim 7 wherein the heavy petroleum distillate oil is a distillate fraction from straight run petroleum having a distillation range according to ASTM D 1160 of 5% at 779° F. through 95% at 967° F., a specific gravity API of 9.3, a viscosity at 140° F. of 123 centistokes and at 210° F. of 18.6 centistokes, an aniline point of 86, a flashpoint of 480° F. COC and a pour point of 55° F.

* * * * *